(12) United States Patent
Rath et al.

(10) Patent No.: US 9,638,032 B2
(45) Date of Patent: May 2, 2017

(54) INTERACTIVE WELLBORE DESIGN MANAGEMENT

(71) Applicant: HALLIBURTON ENERGY SERVICES, INC., Houston, TX (US)

(72) Inventors: Surath Rath, Houston, TX (US); Jonathan Michael-Wilson Currey, Spring, TX (US); Ronald Glen Dusterhoft, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 609 days.

(21) Appl. No.: 14/193,553

(22) Filed: Feb. 28, 2014

(65) Prior Publication Data
US 2015/0248502 A1 Sep. 3, 2015

(51) Int. Cl.
  *G06G 7/48* (2006.01)
  *E21B 49/00* (2006.01)
  *G06F 17/50* (2006.01)

(52) U.S. Cl.
  CPC .......... *E21B 49/003* (2013.01); *G06F 17/509* (2013.01); *G06F 17/5086* (2013.01); *G06F 2217/34* (2013.01)

(58) Field of Classification Search
  CPC ......... G06F 17/00; G06F 17/50; G06Q 10/06; E21B 7/061; E21B 43/00; E21B 43/30
  See application file for complete search history.

(56) References Cited

U.S. PATENT DOCUMENTS

| 2007/0038376 A1* | 2/2007 | Beck | G06F 17/50 702/6 |
| 2007/0199721 A1* | 8/2007 | Givens | G06Q 10/06 166/382 |

(Continued)

FOREIGN PATENT DOCUMENTS

| WO | WO2014025361 | 2/2014 |
| WO | WO2014039030 | 3/2014 |

OTHER PUBLICATIONS

Halliburton, "PROFILE™," Copyright 2013, retrieved from internet on Jan. 14, 2014, 3 pages. https://www.landmarksoftware.com/Pages/PROFILE.aspx.

(Continued)

*Primary Examiner* — Kandasamy Thangavelu
(74) *Attorney, Agent, or Firm* — John W. Wustenberg; Parker Justiss, P.C.

(57) ABSTRACT

Implementations of computer-implemented methods, computer-readable media, and computer systems for interactive wellbore design management include displaying a well design including a wellbore profile representing a wellbore in a user interface. A first well component object is positioned at a first user interface position in the user interface. The first user interface position corresponds to a first well position of a first well component represented by the first well component object in the wellbore. A positioning of a second well component object at a second user interface position in the user interface is detected. The second user interface position corresponds to a second well position of a second well component represented by the second well component object in the wellbore. Using the well design, a compatibility of the second well component positioned at the second well position with the first well position of the first well component is determined.

18 Claims, 10 Drawing Sheets

(56) References Cited

U.S. PATENT DOCUMENTS

| | | | | |
|---|---|---|---|---|
| 2010/0191516 A1* | 7/2010 | Benish | ............... | E21B 43/00 |
| | | | | 703/10 |
| 2011/0290561 A1* | 12/2011 | Randall | ............... | E21B 7/061 |
| | | | | 175/50 |
| 2013/0124176 A1* | 5/2013 | Fox | ............... | G06F 17/00 |
| | | | | 703/7 |
| 2013/0231901 A1* | 9/2013 | Lu | ............... | E21B 43/30 |
| | | | | 703/1 |

OTHER PUBLICATIONS

Whalley et al., "GUI-Facilitated Centralizing Methods and Systems", PCT Application No. PCT/US14/13181, 21 pages.
Whalley et al., "Predefining Elements of a Cemented Wellbore", PCT Application No. PCT/US13/63903, 23 pages.

* cited by examiner

| Profile | Data | | | | | |
|---|---|---|---|---|---|---|
| ⊗ All Wellbore Components (W2) | | | | | | |
| ⊙ Hole Sections | | | | | | |
| ⊙ Casing Components | | | | | | |
| ⊙ Tubing Components | | | | | | |
| ⊙ Packer Components | | | | | | |
| ⊙ Liner Components | | | | | | |
| ⊙ Treatments | | | | | | |
| ⊗ Survey Stations | | | | | | |
| Md | Length | Tvd | | Inclination | Azimuth | Dls |
| 0 | 0 | 0 | | 0 | 0 | 0 |
| Md | Length | Tvd | | Inclination | Azimuth | Dls |
| 100 | 100 | 100 | | 0 | 0 | 0 |
| Md | Length | Tvd | | Inclination | Azimuth | Dls |
| 200 | 100 | 199.9796934092O | | 2 | 1 | 2 |
| Md | Length | Tvd | | Inclination | Azimuth | Dls |
| 300 | 100 | 299.7818O264014 | | 5 | 3 | 3.0 |
| Md | Length | Tvd | | Inclination | Azimuth | Dls |

FIG. 2D

INTERACTIVE WELLBORE DESIGN MANAGEMENT

TECHNICAL FIELD

This disclosure relates to presenting well design information.

BACKGROUND

A wellbore, e.g., a production wellbore, an injection wellbore, or other wellbore, is a complex entity with many components. Wellbore details, which can include details describing components of the wellbore, can be obtained from multiple measurements performed during different operations, e.g., drilling, completion, or other operations. Capturing wellbore details accurately and having easy access to the captured wellbore details can facilitate the study, e.g., an engineering study, of the wellbore and the subterranean zone (e.g., a formation, a portion of a formation, or multiple formations) into which the wellbore is drilled.

BRIEF DESCRIPTION OF DRAWINGS

FIGS. 2A-2D are schematic diagrams of user interfaces presented by the computer system for interactive wellbore design management.

Like reference symbols in the various drawings indicate like elements.

DETAILED DESCRIPTION

This disclosure describes interactive wellbore design management. The techniques described in this disclosure can, in some instances, be implemented as an easy-to-use software component to create wellbore profiles. Using such a software component, wellbores can be constructed and visualized in an interactive manner. The software component can be implemented in well planning before spudding the wellbore, forming the wellbore, and after the wellbore has been completed. While constructing the well profile, the well design can be validated for any inconsistencies or inaccuracies (or both). In some implementations, wellbore details can be displayed in a user interface as grouped collections of wellbore components to facilitate access and correlation. Wellbore trajectories can be constructed and visualized based on measured survey data. Multiple well profiles can be displayed simultaneously, e.g., adjacent to each other. The wellbore data can be provided for viewing and editing, or can be provided in a read-only mode. The design can also include detailed reporting on the wellbore, its trajectory, components and all other associated features. The report can be a viewed on-line or generated as hard copies to printer.

For high angle and horizontal wells with multiple completion intervals, correlating completion intervals to logs and other reservoir information can be difficult, e.g., because of matching True Vertical Depth (TVD) and Measured Depth (MD) with points within the reservoir that the wellbore contacts. Sometimes, reservoir and completion professionals use multiple documents and spend significant amount of time to understand the reservoir quality around a specific point along the wellbore. The techniques described here can be implemented, in some instances, to present additional wellbore information, e.g., well log, reservoir data, or other wellbore information, with the wellbore trajectory to facilitate the visualization and correlation, e.g., during and after wellbore drilling. The availability of such information can enable reservoir and completion professionals to make informed decisions regarding placement of completions to high quality reservoirs sections. In this manner, the techniques can be implemented to present all reservoir information, log information, and completion detail in a user interface in a format that can allow reservoir and completion professionals to make fast and accurate assessments regarding locations of individual completions and the reservoir properties along the wellbore trajectory at any point along the wellbore. The design management also allows retrieval of other valuable information such as manufacturer's design diagram and operation manual concerning the wellbore component.

Figure 1:
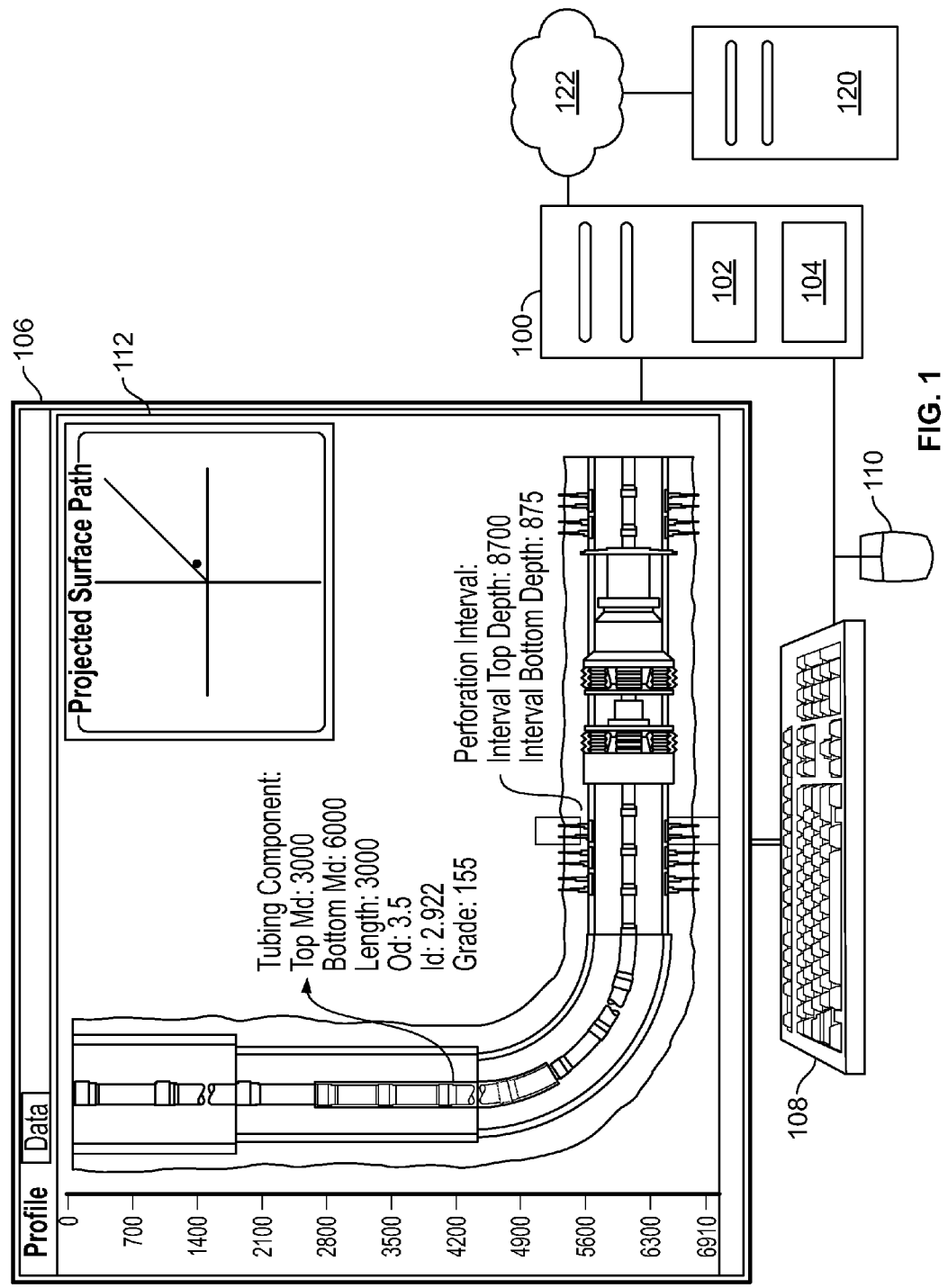
FIG. 1 is a schematic diagram of a computer system for interactive wellbore design management.

FIG. 1 is a schematic diagram of a computer system 100 for interactive wellbore design management. In some implementations, the computer system 100 includes a computer-readable medium 102 storing computer instructions executable by one or more processors 104 to perform operations. The computer system 100 is connected to a display device 106 and one or more input devices, e.g., a keyboard 108, a mouse 110, or other input devices. The display device 106 can be a monitor (e.g., a Cathode Ray Tube (CRT) or Liquid Crystal Display (LCD) monitor), a touchscreen, or other display device. Based, in part, on input received through the one or more input devices, the computer system 100 can display one or more interactive user interfaces, e.g., the user interface 112, in the display device 106. In the one or more user interfaces, the computer system 100 can display a well design including a wellbore profile representing a wellbore. The computer system 100 can be, e.g., a desktop computer, a laptop computer, a tablet computer, a smart phone, a personal digital assistant, or other computer system 100. Alternatively or in addition, the computer system 100 can be a server computer system (not shown) communicating with one or more client devices (not shown) over one or more networks, e.g., the Internet.

The well design can include a wellbore profile, well components that can be positioned in the wellbore profile, well parameters associated with each component (e.g., position relative to the entrance to the wellbore, dimensions, capacities, or other data), well features (e.g., hole sections, treatments, survey stations, or other features), and other well-related data. All or portions of the well design can be stored locally at the computer system 100, e.g., on the computer-readable medium 102, or other local computer-readable media. Alternatively or in addition, all or portions of the well design can be stored remotely, e.g., a computer-readable medium 120 connected to the computer system 100 over one or more wired or wireless networks 122, e.g., the Internet. When the computer system 100 receives input to display a well feature, e.g., a well component, in a user interface, as described below, the computer system 100 can obtain the data associated with the well feature from the computer-readable medium (or media) that stores the well design.

FIGS. 2A-2D are schematic diagrams of user interfaces presented by the computer system for interactive wellbore design management. FIGS. 3A-3F are flowcharts showing processes for interactive wellbore design management. In some implementations, the computer system 100 can implement one or more or all of the processes shown in the flowcharts to perform operations including displaying one or more of the user interfaces, as described below. For example, the computer system 100 can implement the processes as a software component having a standalone architecture that can be incorporated into other software applications, e.g., that implement Windows Presentation Foundation (WPF) technology (offered by Microsoft®, Redmond, Wash.), that provide wellbore management functionality. The software component can be installed, e.g., as a plug-in to another software application to expose the functionalities of the software component to the other software application. In this manner, the software component can be implemented independently of the data structure, the data format, or the data schema of the other software application. Consequently, the software component can be seamlessly plugged into any software application that provides wellbore management functionalities regardless of the application's format.

Figure 3A:
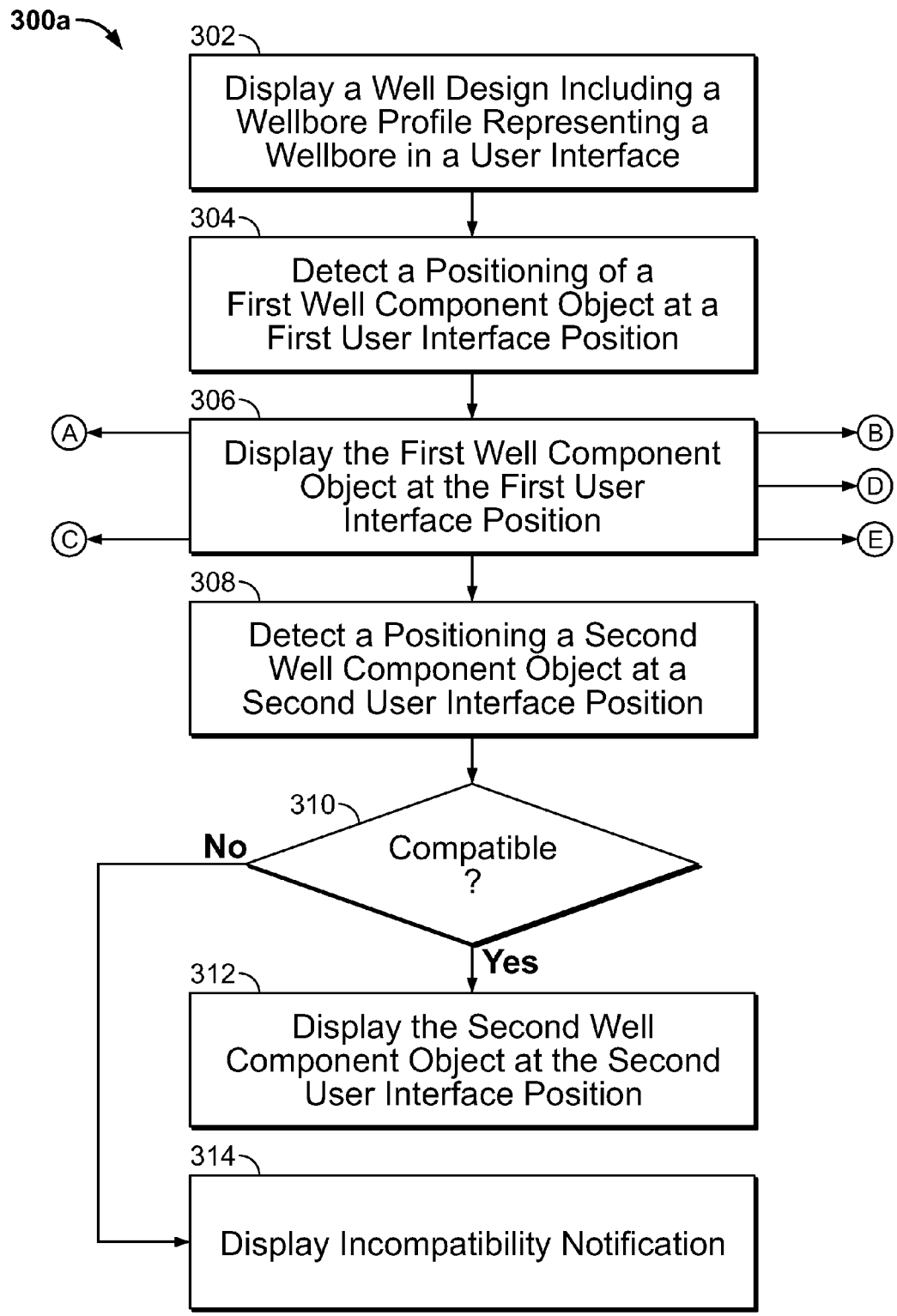
FIGS. 3A-3F are flowcharts showing processes for interactive wellbore design management.

FIG. 3A is a flowchart showing a process 300a for designing a well. In some implementations, a user of the computer system 100 can launch the software component. In response, the computer system 100 can display a user interface in the display device 106. The user interface can serve as a composite panel that the user can use as a canvas to display data associated with the well design. Such data can include one or more of, e.g., a wellbore profile representing a wellbore, well components, a vertical Y-axis to display the true vertical depth of the wellbore, collections of wellbore components, a projected X-Y path of the well profile, and/or other well design-related data.

Figure 2A:
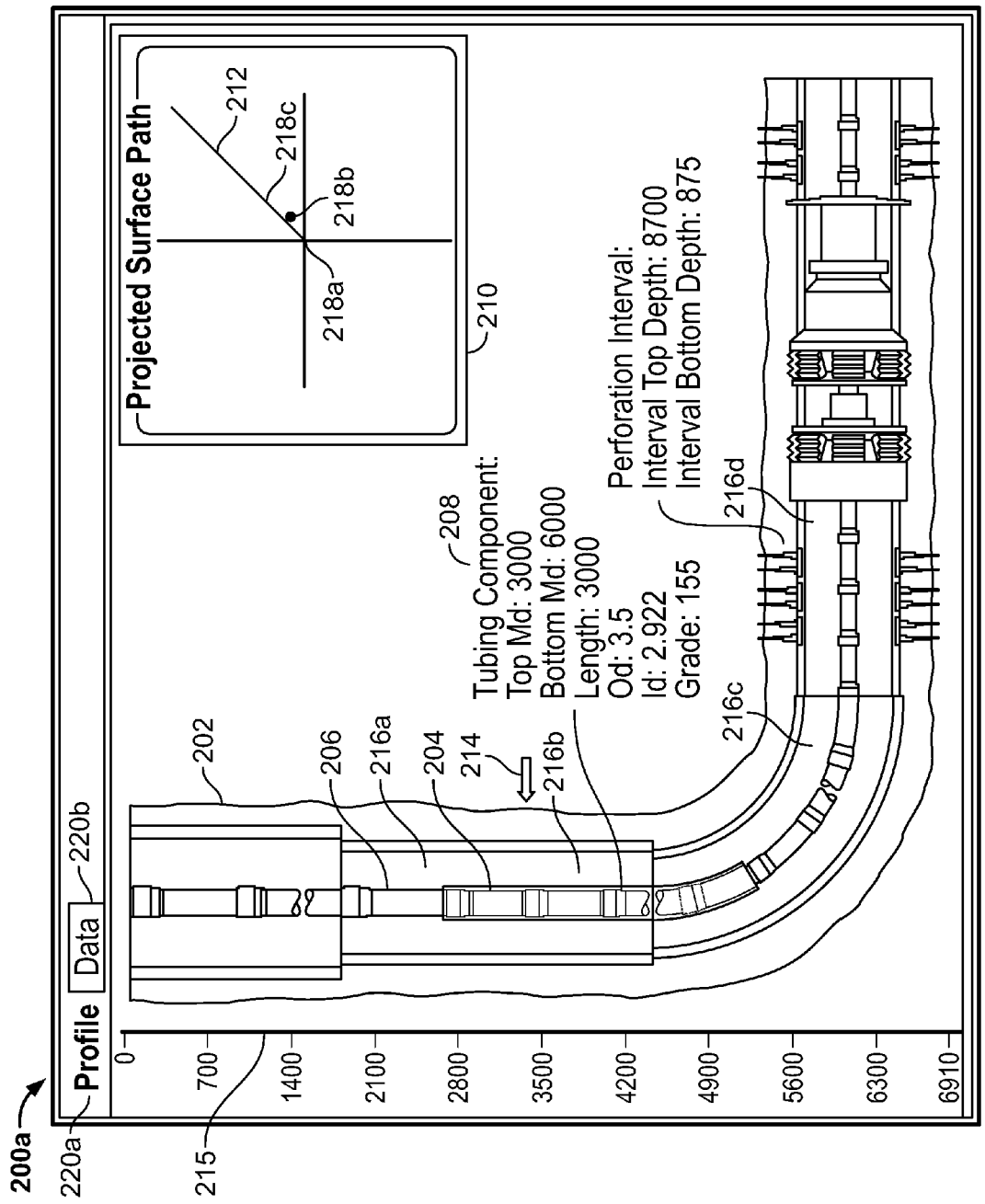

At 302, a well design including a wellbore profile 202 representing a wellbore is displayed in the user interface. In some implementations, the computer system 100 receives input to launch the software component that provides functionalities to design the wellbore. In response, the computer system 100 displays the user interface 200a (FIG. 2A) through which the user can provide the wellbore profile 202, which can include, e.g., the wellbore trajectory. FIG. 2A is a schematic diagram of the user interface 200a. For example, the computer system 100 can display a rectangular user interface, the top surface of which corresponds to a terranean surface of the wellbore. Through the user interface, the user can provide wellbore trajectory details, e.g., a diameter of the wellbore, locations of different diameters, a total vertical depth of the wellbore, a horizontal displacement of the wellbore, angular directions of the wellbore, or other wellbore trajectory details. In response to receiving the wellbore trajectory details, the computer system 100 can construct and display the wellbore profile. For example, the computer system 100 can construct and display the wellbore profile 202 having a specified total vertical depth and a specified horizontal penetration. In some implementations, the computer system 100 can display a scaled Y-axis 215 representing the true vertical depth of the wellbore in the user interface 200a. In addition to displaying the wellbore profile 202 in the user interface 200a, the computer system 100 can update the well design stored, e.g. on the computer-readable medium 102 or the computer-readable medium 122 include the wellbore trajectory details associated with the wellbore profile 202

A first well component object 204, which represents a first well component in the wellbore, is displayed in the user interface 200a. In some implementations, the computer system 100 receives input to display the first well component object 204 in the user interface 200a. The first well component can be one of a casing, a tubing, a packer, a liner, a wellbore tool, a combination of connected components, or other well component that is installed in a wellbore. For example, the computer system 100 can display a list of available well components in the display device 106. The user of the computer system 100 can select the first well component from the displayed list. In response to receiving the input, the computer system 100 accesses the computer-readable medium 102 or 120 (or media) that stores the well design and identifies data associated with the first well component (e.g., dimensions, capacities, or other data). The identified data can include default data for the first well component. As described below, a user can modify the default data using one or more user interfaces. Having identified the first well component and data associated with the first well component, the computer system 100 can display the first well component object 204 in the user interface 200a.

At 304, a positioning of a well component object at a user interface position is detected. For example, the computer system 100 can receive input to position the first well component object 204 at a first user interface position corresponding to a first well position of the first well component in the wellbore. The input to position the first well component object 204 can include a drag-and-drop operation in which the user positions a position indicator 214 (e.g., a mouse cursor, or other position indicator) over the first well component object 204, selects the first well component object 204, and drags and drops the first well component object 204 at the first user interface position. The first well position can represent a depth at which the first well component is to be positioned in the wellbore represented by the wellbore profile 202.

In addition to displaying the first well component object 204 at the first user interface position, the computer system 100 can determine numerical values representing the first well position of the first well component in the wellbore represented by the wellbore profile 202. For example, the computer system 100 can determine a distance of an uphole end of the first tubing from the terranean surface of the wellbore, a distance of a downhole end of the first tubing from the terranean surface, a distance between an outer surface of the first tubing and an inner surface of the wellbore, or other numerical values representing the first well position of the first well component in the wellbore. The computer system 100 can store such numerical values with the well design, e.g., in the computer-readable medium 102 or the computer-readable medium 120.

At 306, the well component object is displayed at the user interface position. For example, in response to the user completing the drag-and-drop operation on the first well component object 204, the computer system 100 can display the first well component object 204 at the first user interface position in the wellbore profile 202.

At 308, a positioning of another well component object at a corresponding user interface position in the user interface is detected. For example, the second well component object 206 represents a second well component that is installed at a second well position, e.g., a second depth, in the wellbore. The computer system 100 can receive input to position the second well component object 206 at the second user interface position in the wellbore profile 202 through a drag-and-drop operation similarly to that described above with reference to the first well component object 204. The second user interface position of the second well component object 206 corresponds to the second well position of the second well component. Similar to the first well component, the computer system 100 accesses the computer-readable medium (or media) that stores the well design and identifies data associated with the second well component (e.g., dimensions, capacities, or other data) in response to receiving the input.

Based on the positioning of the second well component object 206 in the wellbore profile 202 relative to the first well component object 204, the computer system 100 can determine a type of connection between the second well component and the first well component. For example, the computer system 100 can determine, based on the positioning, that the second well component is connected directly to the first well component or indirectly (e.g., through one or more intermediate well components).

At 310, a check can be performed to determine if positioning the other well component at the corresponding well position would be compatible with the well position of the previously positioned well component in the wellbore. As described above, the computer system 100 can receive data associated with the well components, the data describing, e.g., dimensions, capacities, or other data, associated with the well components. The computer system 100 can implement a validation engine, which can use the received data and the relative positions of the second well component object 206 and the first well component object 204 in the wellbore profile 202 to determine whether the second well component can be positioned at the second well location while the first well component is positioned at the first well location.

In an example in which the first well component is a first tubing and the second well component is a second tubing (or a packer) connected directly to the first tubing, the computer system 100 checks if a length of the second tubing will fit in the wellbore that includes the first tubing and that has the wellbore profile 202. In other examples, the computer system 100 can compare multiple features of the first and second tubings (e.g., cross-sectional diameters, end connections, or other features) for compatibility. In implementations in which multiple well component objects are displayed in the user interface, the computer system 100 can check the compatibility of the well component represented by one or more or all of the multiple well objects with the second well component.

If it is determined that the two well components are compatible at the respective well positions, then, at 312, the other well component object is displayed at the corresponding user interface position. If, on the other hand, it is determined that that the two well components are incompatible at the respective well positions, then, at 314, an incompatibility notification is displayed in the user interface, and the other well component object is not displayed at the second user interface position. For example, in response to determining that the first well component and the second well component are incompatible, the computer system 100 can display a pop-up message in the user interface 200a that includes an incompatibility message. In this manner, the computer system 100 can validate the well design for inconsistencies or inaccuracies while the user is developing the well design. Similar to the first well component, the computer system 100 can determine numerical values representing the second well position of the second well component in the wellbore represented by the wellbore profile 202, and store such numerical values with the well design, e.g., in the computer-readable medium 102 or the computer-readable medium 120.

Figure 3B:
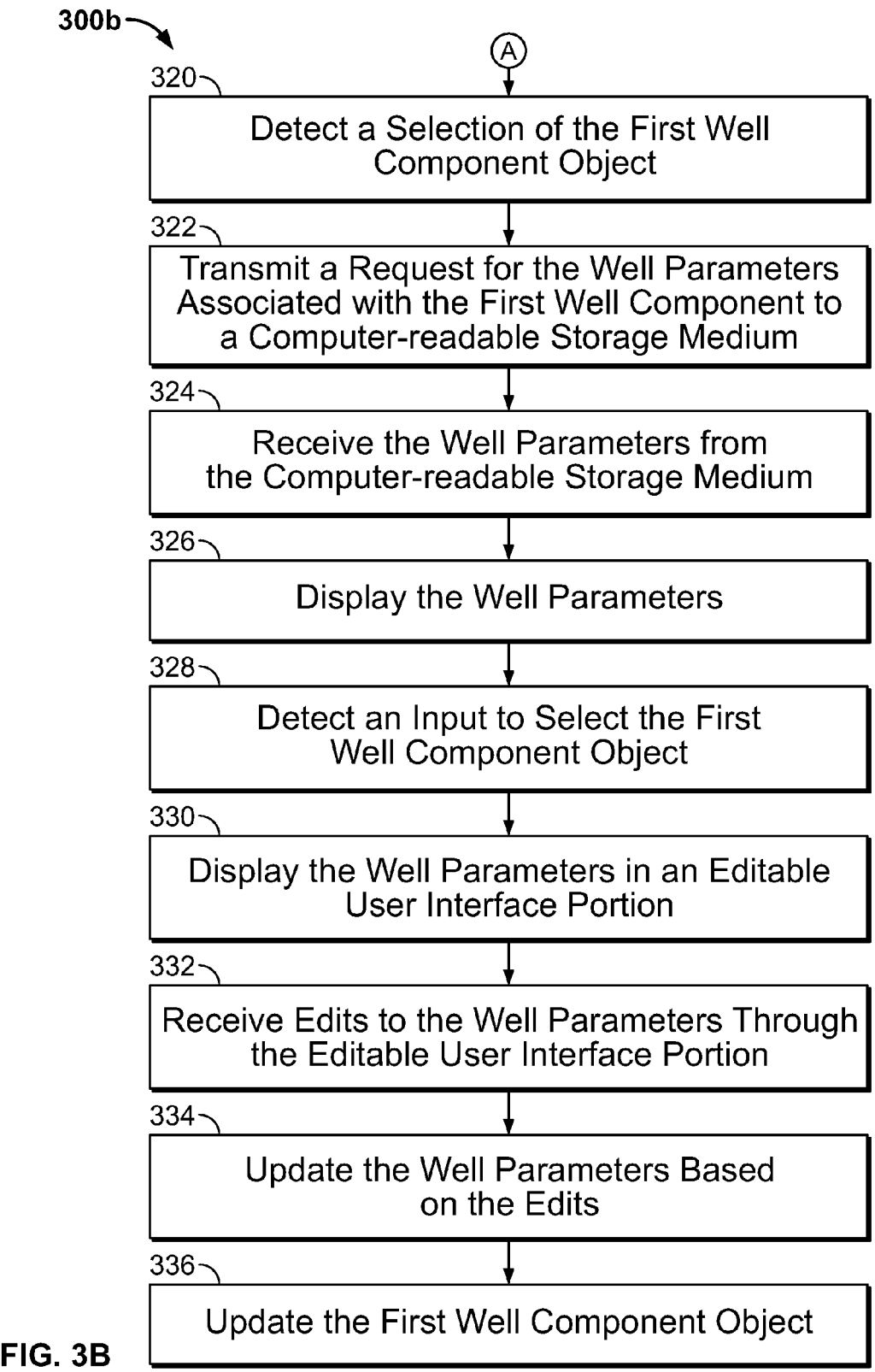

FIG. 3B is a flowchart showing a process 300b for displaying information associated with the well. At 320, a selection of a well component object is detected. For example, a user of the computer system 100 can position a position indicator 214 (e.g., a mouse cursor, a stylus, the user's finger or other position indicator) over the first well component object 204 in the user interface. The computer system 100 can detect the selection of the first well component object 204 in response to such positioning of the position indicator 214. In some implementations, the computer system 100 can display the first well component object 204 in a visually discernible manner in response to detecting the selection. For example, the computer system 100 can display the first well component object 204 in a first color when the first well component object 204 is unselected and in a second color different from the first color in response to detecting the selection.

At 322, a request for well parameters associated with the selected well component is transmitted to the computer-readable storage medium. In some implementations, while the position indicator 214 remains over the first well component object 204 (e.g., during mouseover of the first well component object 204), the computer system 100 can transmit a request for the well parameters associated with the first well component to the computer-readable medium (e.g., the computer-readable medium 102 or the computer-readable medium 120) that stores the well design.

At 324, the well parameters are received from the computer-readable medium. For example, the computer system 100 can receive the well parameters associated with the well component from the computer-readable medium that stores the well design.

At 326, the well parameters are displayed. For example, the computer system 100 can display the well parameters 208 associated with the first well component in the user interface 200a. The well parameters 208 can include, e.g., an identifier identifying the first well component, a top measured depth, a bottom measured depth, a length, an outer diameter, an inner diameter, a grade, combinations of them, or other well parameters. In some implementations, the well parameters can be uploaded and displayed together with the completion plan of well components. For example, while and after the well is drilled and/or produced, a multitude of other properties pertaining to reservoir can be uploaded and displayed together with the well component and the well depth correlated to the completion plan of well components. Such properties may include petro-physical analysis done from analysis on cuttings produced during drilling, mud logs, open-hole logs such as Gamma Ray Log, Magnetic Resonance Imaging Log (MRIL), Resistivity Log and cased-hole logs such as Casing Collar Log, Pulsed Neutron Log and Production Logging Tool (PLT) Log.

The first well component object 204 that represents the first well component spans a length in the user interface 200a which corresponds to an actual length of the first well component. That is, each position on the first well component object 204 in the wellbore profile 202 corresponds to a corresponding depth in the wellbore. The user can move the position indicator 214 across all or portions of the length of the first well component object 204. For each position of the position indicator 214 over the first well component object 204, the computer system 100 can detect a corresponding depth of the first well component in the wellbore by accessing the stored well design. As the user moves the position indicator 214 across the length of the first well component object 204, the computer system 100 can update the depth shown in the well parameters 208. In this manner, as the user mouses over the first well component object 204 in the wellbore profile 202, the computer system 100 displays the multiple depths that the first well component spans in the wellbore.

A 328, input to select the well component object is received. For example, the user of the computer system 100 can select the first well component object 204, e.g., by right-clicking or double-clicking with a mouse, or double-tapping or pressing and holding with a stylus or the user's finger on a touchscreen, on the first well component object 204. The input to select the first well component objects 204 described here can include an operation in addition to the selection operation described at 320. The computer system 100 can detect the input to select the first well component object 204.

Figure 2B:
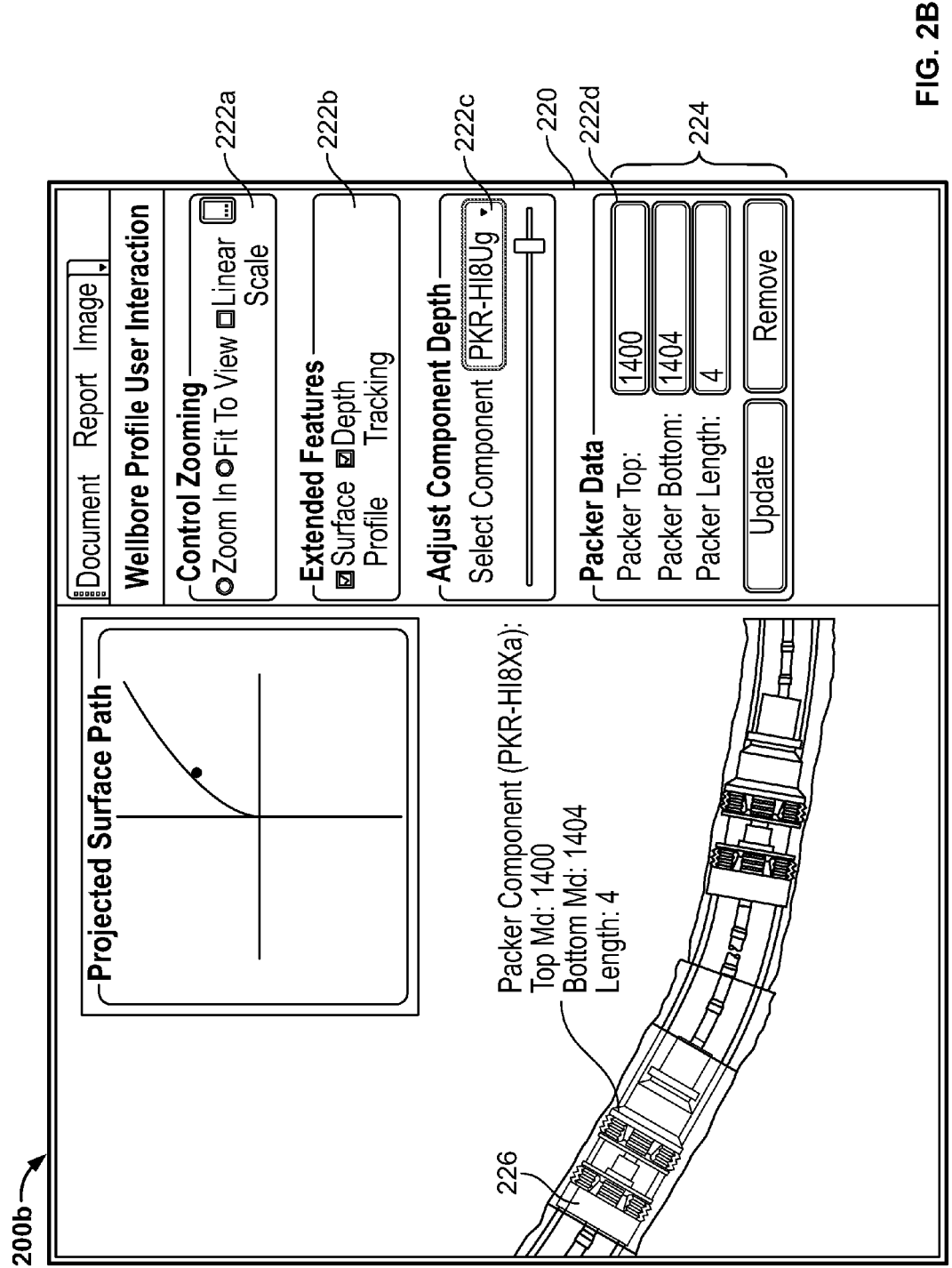

At 330, the well parameters are displayed in an editable user interface portion. FIG. 2B is a schematic diagram of a user interface 200b. For example, the computer system 100 can display the user interface 200b and, in the user interface 200b, display a well component object 226 representing a well component (e.g., a packer) in the wellbore represented by the wellbore profile 202. In response to input to selection of the well component object 226, as described above, the computer system 100 can display the editable user interface portion 220. In the user interface portion 220, the computer system 100 can display well parameters associated with the well component represented by the well component object 226. The well parameters can include, e.g., a component identifier, component dimensions, or other well parameters. In some implementations, the computer system 100 can display reports that include the well parameters in the well component object 226. The computer system 100 can display the reports in a format in which the report can be exported (e.g., as PDF files, spreadsheets, or other export-friendly formats).

At 332, edits to one or more of the well parameters is received through the editable user interface portion. For example, the user of the computer system 100 can edit the well parameters associated with the well component object 226 using the user interface portion 222d. Alternatively, or in addition, the user can edit an appearance of the well component object 226, turn on extended features associated with the well component object 226, or select a different well component using the user interfaces 222a, 222b, or 22c, respectively.

At 334, the well parameters are updated based on the edits. For example, the computer system 100 can update the stored well design to reflect the edits. At 336, the well component object is updated. For example, the user can have changed a length, diameter, or other dimension of the well component object 226 by providing edits through the editable user interface portion 220. In response, the computer system 100 can modify an appearance of the well component object 226 to reflect the edits.

Figure 2C:
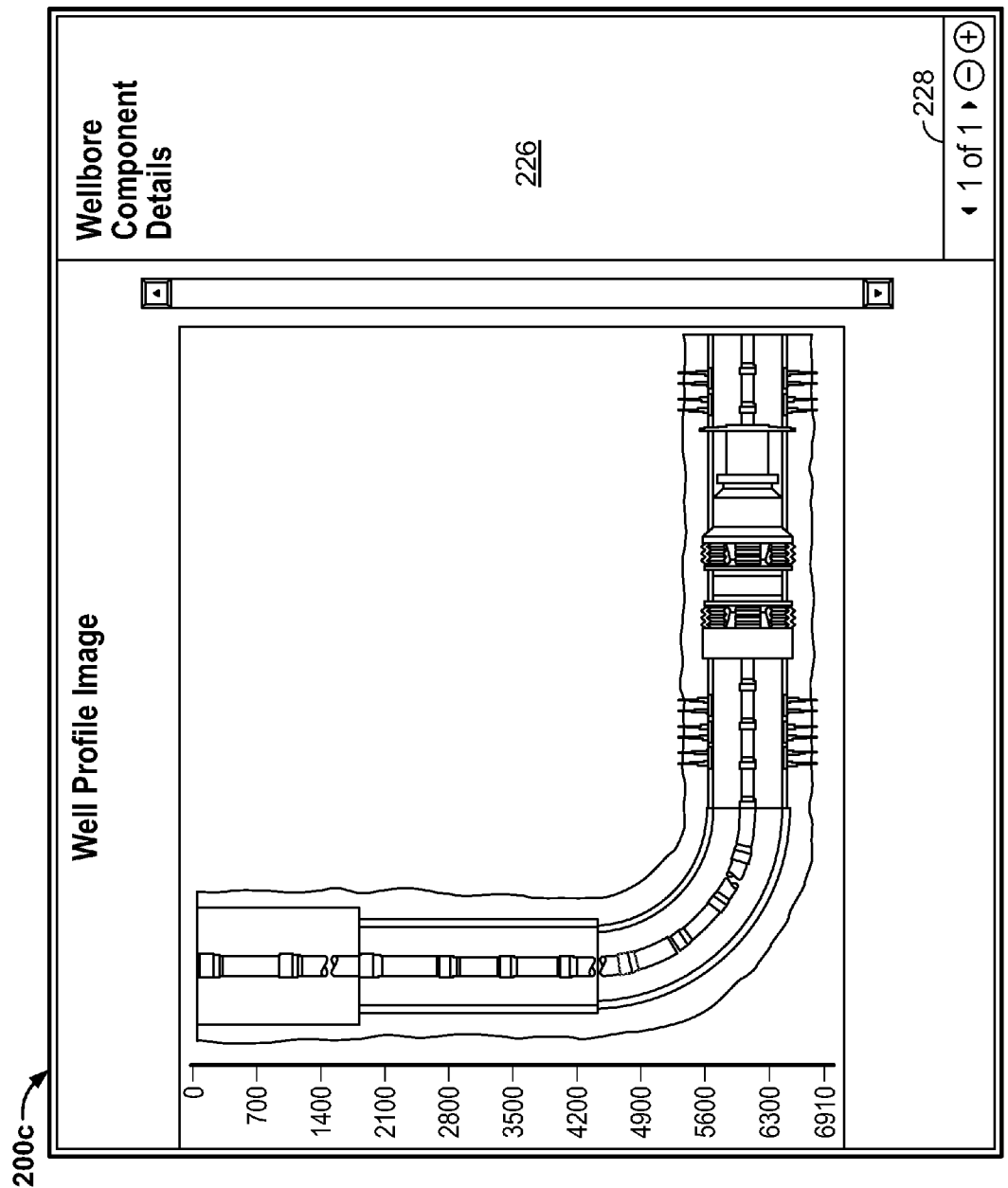
Figure 3C:
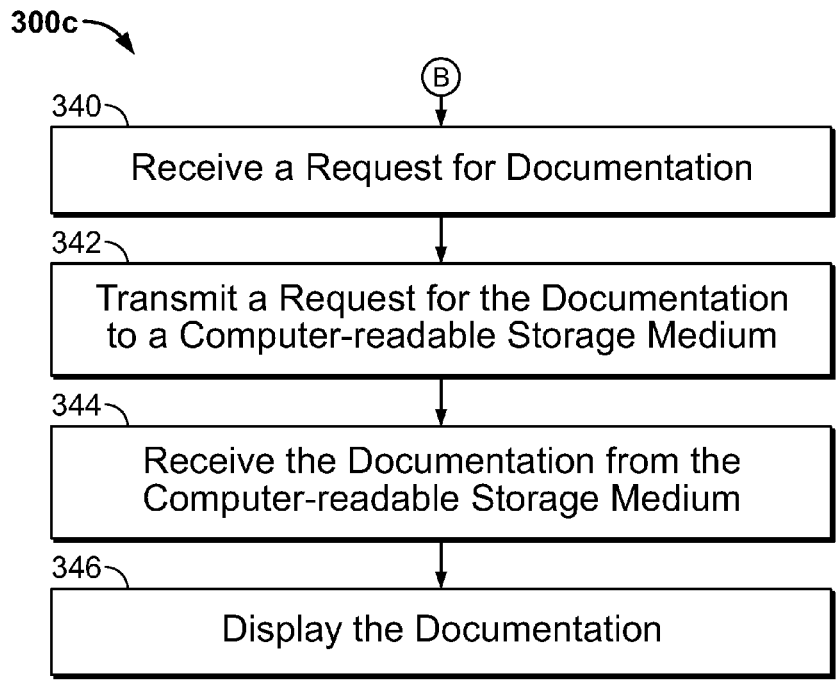

FIG. 3C is a flowchart of a process 300c for displaying documentation associated with well components in the user interface. At 340, a request for documentation associated with the well component is received. For example, the user of the computer system 100 can select the first well component object 204, and then provide input representing a request for documentation associated with the first well component represented by the first well component object 204. In response to receiving the request for the documentation, at 342, a request for the documentation is transmitted to the computer-readable medium. For example, the computer system 100 can transmit the request for the documentation to the computer-readable medium that stores the well design. At 344, the documentation is received from the computer-readable medium, and, at 346, displayed. FIG. 2C is a schematic diagram of a user interface 200c displaying the documentation in a user interface portion 226.

Figure 3D:
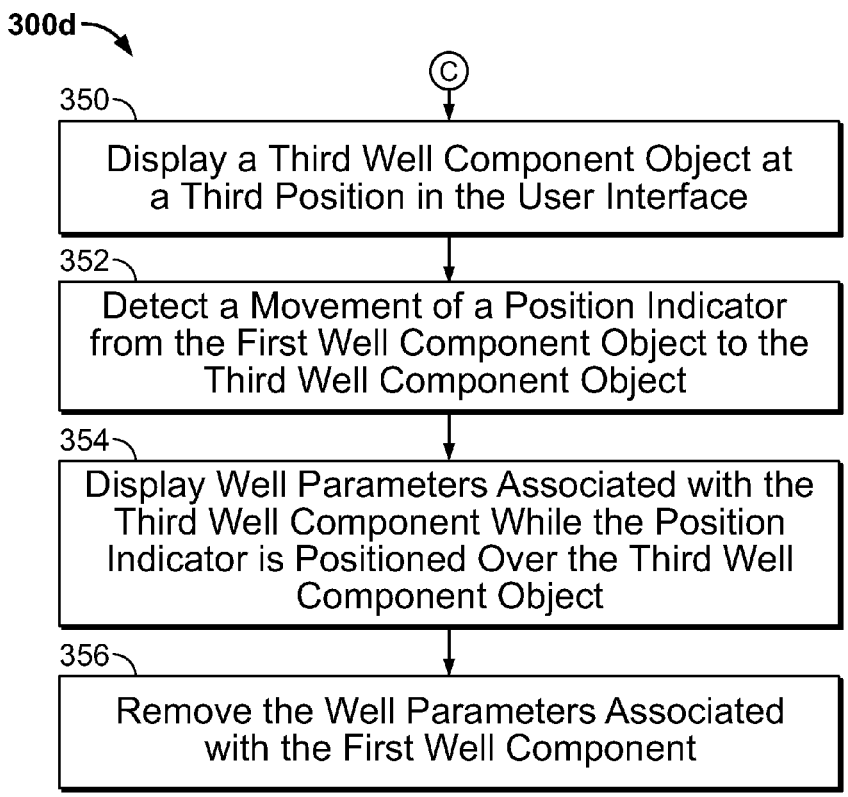

FIG. 3D is a flowchart of a process 300d for displaying well parameters associated with well components as a position indicator is moved over the well component objects. At 350, another well component object is displayed at a corresponding user interface position in the user interface. For example, the second user interface object 206 is displayed in the user interface 200a as described above with reference to FIG. 3A. The second user interface object 206 occupies a second user interface position in the user interface 200a, which corresponds to a second well position of the second well component in the wellbore. Also, as described above with reference to FIG. 3B, well parameters associated with the first well component are displayed in response to the position indicator 214 being positioned over the first well object 204. In particular, as the user moves the mouse over the first well component object 204, the computer system 100 continuously updates the well parameters 208 to reflect changes to the well parameters (e.g., depth in the wellbore) according to changes to the position of the position indicator 214 over the first well component object 204.

At 352, a movement of the position indicator from a well component object to the other well component object is detected. For example, the computer system 100 determines that the position indicator 214 has moved from over the first well component object 204 to over the second well component object 206. Such movement of the position indicator 214 represents a selection of the second user interface object 206.

In response to detecting the selection of the other user interface object, at 354, well parameters associated with the other well component are displayed while the position indicator is positioned over the other well component object. For example, as the user moves the mouse away from the first well component object 204 and over the second well component object 206, the computer system 100 displays the well parameters associated with the second well component in the user interface 200a. At 356, the well parameters associated with the previously selected well component object are removed from display. For example, the computer system 100 removes from the user interface 200a, the well parameters 208 associated with the first well component. In this manner, the user of the computer system 100 can view well parameters associated with the various well components by positioning the position indicator 214 over the corresponding well component objects and/or by scanning the position indicator 214 across the wellbore profile 202 from one well component object to the next.

As described above, the well parameters associated with the well components are stored in the computer-readable medium 120 or the computer-readable medium 122 together with the well design. In some implementations, the computer-readable medium 120 stores the well parameters as two-dimensional wellbore data in either the XZ plane or the YZ plane (or both). In some implementations, the computer system 100 can display wellbore information in the XY plane using the two-dimensional wellbore data in the XZ or the YZ plane (or both), as described below.

Figure 3E:
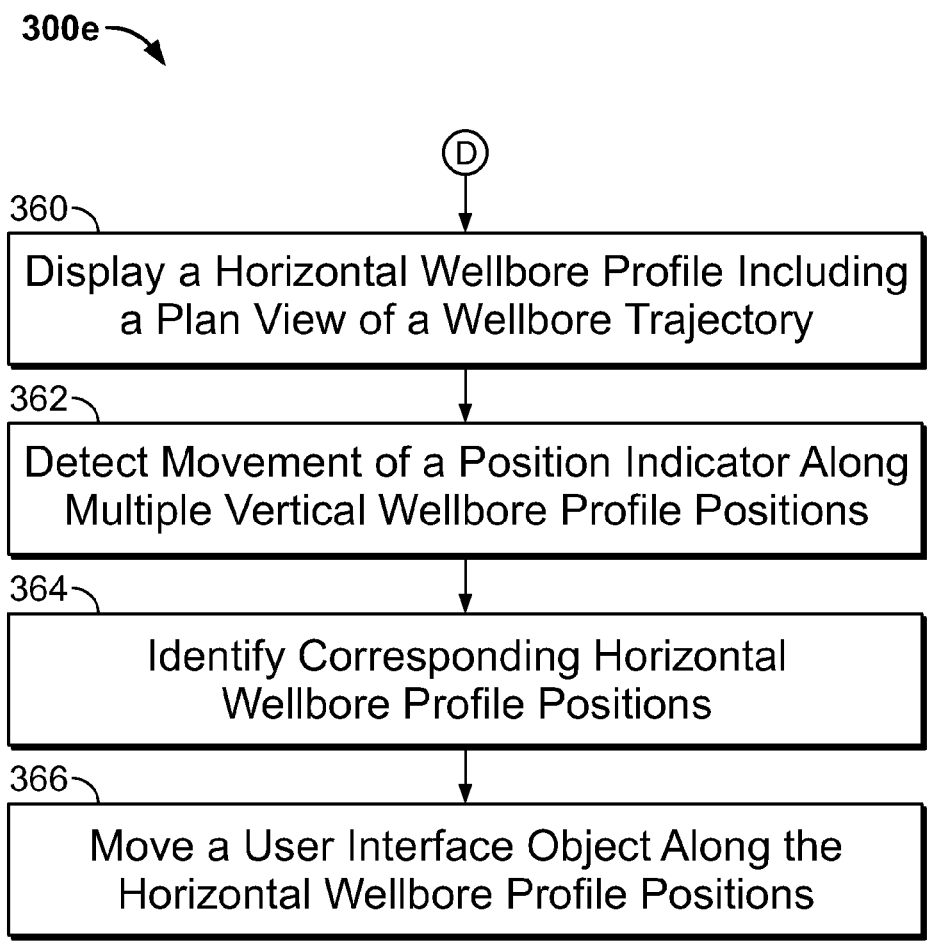

FIG. 3E is a flowchart of a process 300e for tracking movement across vertical and horizontal profiles of the wellbore. The well design, i.e., the well profile 202 and the well component objects, displayed in the user interface 200a represent a vertical wellbore profile of the wellbore on a vertical plane, e.g., the XZ plane or the YZ plane (or both). The top edge of the user interface 200a represents a terranean surface that that includes the entrance to the wellbore. The Y-axis 215 shows a true vertical depth of the wellbore from the terranean surface. The wellbore profile 202 shown in the user interface 200a includes a horizontal portion.

At 360, a horizontal wellbore profile of the wellbore including a plan view of a well trajectory of the wellbore on a horizontal plane can be displayed. For example, the computer system 100 can display a user interface object 210 that shows the horizontal wellbore profile as a projected surface path. In the user interface object 210, the computer system 100 can display a plan view of the wellbore trajectory. An area of the user interface object 210 can represent a geographical area encompassing the wellbore represented by the wellbore profile 202. The line 212 in the user interface object 210 represents the trajectory of the wellbore in the geographical area when the wellbore profile 202 is viewed in the XY plane. The intersection of the vertical and horizontal lines in the user interface object 210 represent an entrance to the wellbore at the terranean surface. The computer system 100 can determine a distance and a direction of the line 212 from the intersection of the vertical and horizontal lines based on a distance and direction of the wellbore profile 202 from the wellbore entrance.

At 362, a movement of the position indicator along multiple vertical wellbore profile positions included in the vertical wellbore profile is detected. For example, the user of the computer system 100 moves the position indicator 214 across multiple positions (e.g., the first position 216a, the second position 216b, the third position 216c, the fourth position 216d, or other positions) on the wellbore profile 202.

At 364, corresponding horizontal wellbore profile positions are identified. As described above, the computer system 100 determines well parameters associated with a well component in response to detecting a positioning of the position indicator 214 at a position on the corresponding well component object in the user interface 200a. By doing so, the computer system 100 determines well parameters associated with one or more well components at each of the first position 216a, the second position 216b, the third position 216c, the fourth position 216d, and other positions. The well parameters include wellbore survey data, which includes measurement on inclination and azimuth values at each point of measurement along the wellbore trajectory. Using the inclination and azimuth values, the computer system 100 determines X-Y coordinates of the respective well components relative to the wellbore entrance at the terranean surface in a plan view.

For example, the first position 216a and the second position 216b are each positioned substantially vertically below the wellbore entrance at the terranean surface. Accordingly, the computer system 100 can determine that the X-Y coordinate for the first position 216a and the second position 216b is (0,0). Each of the third position 216c and the fourth position 216d is horizontally offset from the wellbore entrance at the terranean surface. Accordingly, the computer system 100 can determine that each of the third position 216c and the fourth position 216d has either a non-zero X-coordinate value or a non-zero Y-coordinate value or both. The computer system 100 can similarly determine corresponding X-Y coordinates for each position on the vertical wellbore profile across which the user moves the position indicator 214. The computer system 100 can store the determined X-Y coordinates.

At 366, a user interface object is moved along the horizontal wellbore profile positions. For example, the computer system 100 can display a user interface object, such as a solid circle, on the user interface object 210 that shows the horizontal wellbore profile. As the user moves the position indicator 214 across multiple positions (e.g., the first position 216a, the second position 216b, the third position 216c, the fourth position 216d, or other positions) on the vertical wellbore profile, the computer system 100 can move the user interface object across corresponding horizontal wellbore profile positions (e.g., the first position 218a, the second position 218b, the third position 218c) on the horizontal wellbore profile.

For example, as the user moves the position indicator 214 across the vertical portion of the wellbore profile 202 which includes first position 216a, the second position 216b, the computer system 100 can determine the corresponding X-Y coordinates, as described above, and display the solid circle at the first position 218a which lies on the intersection of the vertical and horizontal lines in the user interface object 210. As the user moves the position indicator 214 across the horizontal portion of the wellbore profile 202 which includes the third position 216c and the fourth position 216d, the computer system 100 can determine the corresponding X-Y coordinates, as described above, and display the solid circle as moving to the second position 218b and the third position 218c on the line 212. In particular, when the user positions the position indicator 214 at the position 216c, the computer system 100 displays the solid circle at the position 218b. When the user moves the position indicator from the position 216c to the position 216d, the computer system moves the solid circle along the line 212 from the position 218b to the position 218c.

Figure 3F:
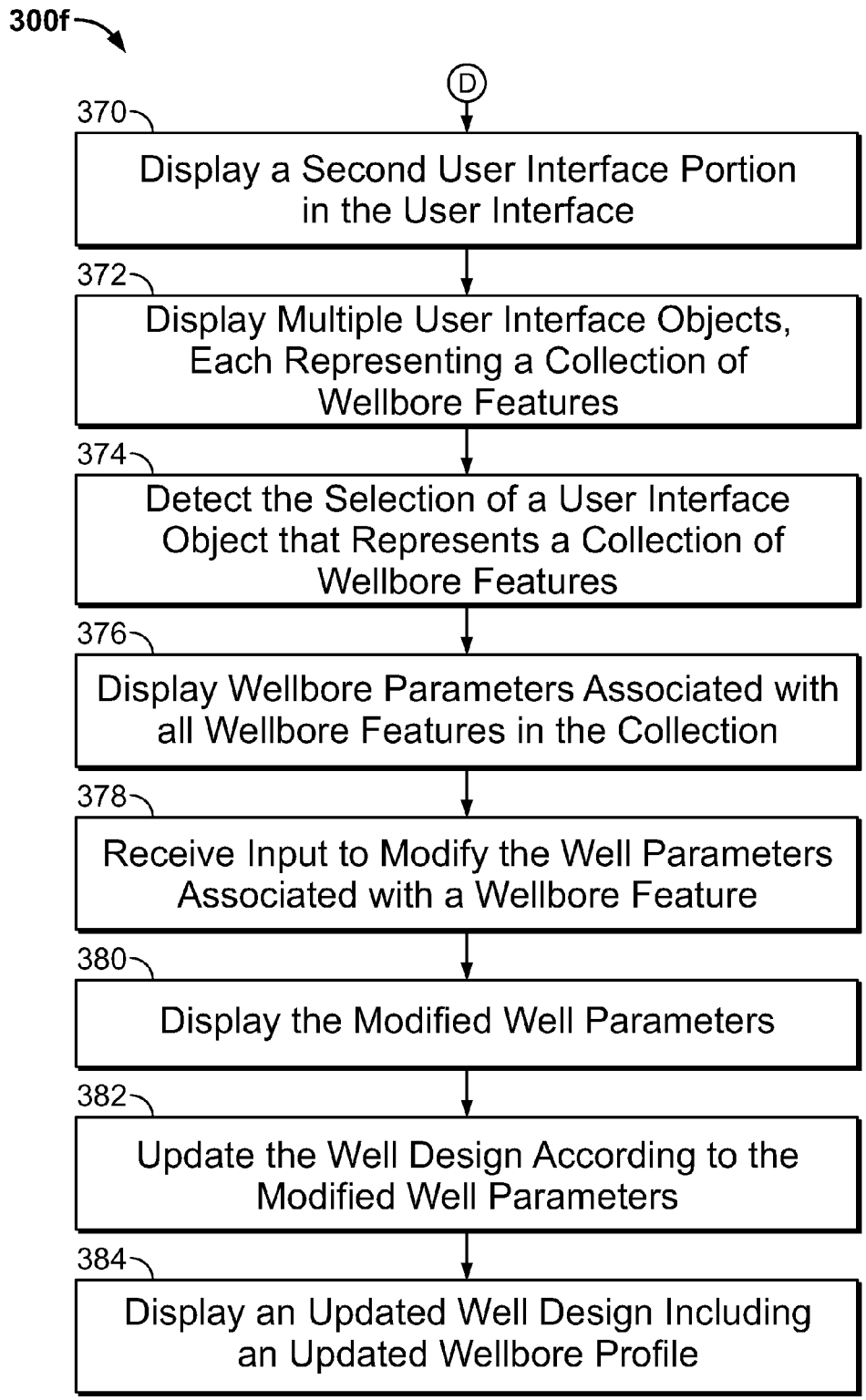

In some implementations, the computer system 100 can display the user interfaces 200a, 200b, 200c, or other user interfaces in a first user interface portion that represents profile views of the well design. The computer system 100 can display a second user interface portion that represents data views of the wellbore components. In some implementations, the computer system 100 can display a "Profile" tab object 220a and a "Data" tab object 220b that are selectable to access the first user interface portion and the second user interface portion, respectively. FIG. 2D is a schematic diagram of a user interface included in the second user interface portion. FIG. 3F is a flowchart of a process 300f for displaying user interfaces in the second user interface portion.

At 370, the second user interface portion is displayed in the user interface. For example, in response to a user selecting the "Data" tab object 220b, the computer system 100 can display the user interface 200d and remove user interfaces included under the "Profile" tab object 220a from display. In the user interface 200d, the computer system 100 can display a user interface object 250 identifying all wellbore features including wellbore components, hole sections, treatments, survey stations, and other wellbore features. As described below, the computer system 100 can display the wellbore features in a hierarchical manner having a tree structure in which the root node represents all wellbore features, each leaf node represents a wellbore feature (e.g., a wellbore component, a hole section, a treatment, or other wellbore feature) and intermediate nodes represent collections of wellbore features (e.g., collections of wellbore components, or collections of other wellbore features). The computer system 100 can display each node in the tree structure as a corresponding user interface object, and allow the user to select each node and to access the wellbore feature (or features) associated with the node.

At 372, multiple user interface objects, each representing a collection of wellbore components, is displayed. For example, the computer system 100 can group wellbore features into one or more collections, each collection including at least one wellbore feature. Features in a collection can be related to each other. In the user interface 200d, the computer system 100 can display a first user interface object 252a representing a collection of hole sections, a second user interface object 252b representing a collection of casing components, a third user interface object 252c representing a collection of tubing components, a fourth user interface object 252d representing a collection of packer components, a fifth user interface object 252e representing a collection of liner components, a sixth user interface object 252f representing a collection of treatments, and a seventh user interface object 252g representing a collection of survey stations. In addition to these, the design management also allows including other components such as perforations, sand screens, pumps, gas-lift mandrels, chemical injection lines, fiber optic cable, hydraulic lines, down hole valves and down hole flow control devices.

At 374, a selection of a user interface object that represents a collection of wellbore features is detected. In some implementations, each of the user interface objects 252a-252g can be a drop-down list, the selection of which can result in the computer system 100 displaying additional user interface objects that represent features included in the collection. For example, in response to the selection of the seventh user interface object 252g representing a collection of survey stations, the computer system 100 can display the wellbore features included in the collection the wellbore parameters associated with each feature. For example, in response to the selection of the user interface object 252g representing the collection of survey stations, the computer system 100 can display user interface objects 254a, 254b, 254c, and 254d, each of which represents a respective survey station. In the user interface objects, the computer system 100 can display wellbore parameters associated with each survey station. The computer system 100 can obtain the wellbore parameters from the computer-readable medium that stores the well design.

At 378, input to modify the well parameters associated with a wellbore feature is received. For example, one or more of the user interface objects 254a, 254b, 254c, or 254d can be editable objects, such as textboxes, in which the wellbore parameters associated with the respective survey stations are displayed. A user can select and edit the parameters in one or more of the editable objects.

At 380, the modified well parameters are displayed. For example, the computer system 100 can display the modified well parameters in the editable objects in response to the user selecting and editing the parameters. At 382, the well design is updated according to the modified well parameters. For example, the computer system 100 can update the well design stored in the computer-readable medium.

At 384, an updated well design including an updated wellbore profile is displayed. For example, the collection of tubing components represented by the user interface object 252c can include the first tubing represented by the first user interface object 204. The user can update a length of the first tubing using the user interface object 252c as described above. The computer system 100 can update the well design stored in the computer-readable medium 120 or the computer-readable medium 122. Subsequently, the computer system 100 can update the first user interface object 204 to reflect the changes to the length of the first tubing. When the user provides input to display the user interface 200a, e.g., by selecting the "Profile" tab object 22a, then the computer system 100 can display the updated first user interface object 204 in the user interface 200a. In some implementations, the computer system 100 can implement the validation engine described above to identify any inconsistencies or inaccuracies, and display the updated first user interface object 204 upon determining that the updated well component is compatible with other well components in the wellbore.

Certain aspects of the subject matter described here can be implemented as a computer-implemented method. One or more processors display a well design including a wellbore profile representing a wellbore in a user interface. The one or more processors display a first well component object positioned at a first user interface position in the user interface. The first user interface position corresponds to a first well position of a first well component represented by the first well component object in the wellbore. The one or more processors detect a positioning of a second well component object at a second user interface position in the user interface. The second user interface position corresponds to a second well position of a second well component represented by the second well component object in the wellbore. Using the well design, the one or more processors determine a compatibility of the second well component positioned at the second well position with the first well position of the first well component.

This, and other aspects, can include one or more of the following features. The first well component and the second well component can be a tubing and a packer, respectively. Using the well design, it can be determined that positioning the second well component at the second well position is compatible with the first well position of the first well component. The second well component object can be displayed at the second user interface position in response to determining the compatibility. Using the well design, it can be determined that positioning the second well component at the second well position is incompatible with the first well position of the first well component. A notification of the incompatibility can be displayed in the user interface in response to determining the incompatibility. A selection of the first well component object can be detected. Well parameters associated with the first well component can be displayed in the user interface and while the first well component object is selected in response to detecting the selection of the first well component object. In response to detecting the selection of the first well component object, a request for the well parameters associated with the first well component can be transmitted to a computer-readable storage medium storing well data including the well parameters associated with the first well component. The well parameters associated with the first well component can be received from the computer-readable storage medium in response to transmitting the request. A request for documentation associated with the first well component can be received. In response to receiving the request for the documentation, a request for the documentation can be transmitted to the computer-readable storage medium. The documentation can be received from the computer-readable storage medium. At least a portion of the documentation can be displayed in the user interface. An input to select the first well component object and be detected. The well parameters can be displayed in an editable user interface portion in the user interface. Through the editable user interface portion, edits to one or more of the well parameters can be received. The well parameters can be updated based on the edits received through the editable user interface portion. In the first user interface, the first well component object can be updated according to updates to the well parameters. A third well component object can be displayed at a third position in the user interface. The third user interface position can correspond to a third well position of a third well component represented by the third well component object in the wellbore. A selection of the third user interface object can be detected. In response to detecting the selection of the third user interface object, well parameters associated with the third well component can be displayed in the user interface while the third user interface object is selected, and the well parameters associated with the first well component can be removed from the user interface. The well design displayed in the user interface can represent a vertical wellbore profile of the wellbore on a vertical plane. A horizontal wellbore profile of the wellbore can be displayed in the user interface. The horizontal wellbore profile can include a plan view of a wellbore trajectory of the wellbore. A movement of a position indicator along multiple vertical wellbore profile positions included in the vertical wellbore profile can be detected. At each position of the multiple vertical profile positions, a corresponding horizontal wellbore profile position can be identified in the horizontal wellbore profile. The user interface object can be displayed on the wellbore trajectory at the corresponding horizontal wellbore profile position. The user interface can be a first user interface portion. A second user interface portion can be displayed. The second user interface portion can include multiple user interface objects, each representing a collection of wellbore features. Each collection including at least one wellbore feature. The first user interface portion may not be displayed in response to displaying the second user interface portion. A selection of a user interface object representing the first collection of wellbore features including the first well component can be detected in the second user interface portion. In response to detecting the selection, well parameters associated with well components in the first collection can be displayed. The well parameters can include well parameters associated with the first well component. Input to modify the well parameters associated with the first well component can be received in the second user interface portion. In response to receiving the input, modified well parameters associated with the first well component can be displayed in the second user interface portion. The well parameters can be modified according to the input. The well design displayed in the first user interface portion can be updated according to the modified well parameters. An updated well-designed including an updated wellbore profile representing the wellbore can be displayed in the first user interface portion. The multiple user interface objects can include at least one of a first user interface object representing a collection of casing components, a second user interface object representing a collection of tubing components, a third user interface object representing a collection of packer components, or a fourth user interface object representing a collection of liner components.

Certain aspects of the subject matter described here can be implemented as a computer-readable medium storing instructions executable by one or more processors to perform operations described here. Certain aspects of the subject matter described here can be implemented as a wellbore system. The system includes one or more processors, and a computer readable medium storing instructions, executable by the one or more processors to perform operations described here. The term "processors" encompasses all kinds of apparatus, devices, and machines for processing data, including by way of example a programmable processor, a computer, a system on a chip, or multiple ones, or combinations, of the foregoing. A processor can include special purpose logic circuitry, for example, an FPGA (field programmable gate array) or an ASIC (application-specific integrated circuit). The processor can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The processor and execution environment can realize various different computing model infrastructures, such as web services, distributed computing and grid computing infrastructures.

A computer storage medium, for example, the computer-readable medium, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical and/or non-transitory components or media (for example, multiple CDs, disks, or other storage devices).

A number of implementations have been described. Nevertheless, it will be understood that various modifications may be made without departing from the spirit and scope of the disclosure.

The invention claimed is:

1. A computer-implemented method comprising:
displaying, by one or more processors and in a user interface, a well design including a wellbore profile representing a wellbore, wherein the well design displayed in the user interface represents a vertical wellbore profile of the wellbore on a vertical plane and a horizontal wellbore profile of the wellbore including a plan view of a wellbore trajectory of the wellbore;
displaying, by the one or more processors, a first well component object positioned at a first user interface position in the user interface, the first user interface position corresponding to a first well position of a first well component represented by the first well component object in the wellbore;
detecting, by the one or more processors, a positioning of a second well component object at a second user interface position in the user interface, the second user interface position corresponding to a second well position of a second well component represented by the second well component object in the wellbore;
determining, by the one or more processors and using the well design, a compatibility of the second well component positioned at the second well position with the first well position of the first well component;
detecting, in the user interface, a movement of a position indicator along a plurality of vertical wellbore profile positions included in the vertical wellbore profile; and
at each position of the plurality of vertical wellbore profile positions:
identifying a corresponding horizontal wellbore profile position in the horizontal wellbore profile; and
displaying, on the wellbore trajectory, a user interface object at the corresponding horizontal wellbore profile position.

2. The method of claim 1, wherein the first well component is a tubing and the second well component is a packer.

3. The method of claim 1, wherein determining, using the well design, the compatibility comprises determining that positioning the second well component at the second well position is compatible with the first well position of the first well component, and wherein the method further comprises displaying the second well component object at the second user interface position in response to determining that positioning the second well component at the second well position is compatible with the first well position of the first well component.

4. The method of claim 1, wherein determining, using the well design, the compatibility comprises determining that positioning the second well component at the second well position is incompatible with the first well position of the first well component, and wherein the method further comprises displaying, in the user interface, a notification of the incompatibility in response to determining that positioning the second well component at the second well position is incompatible with the first well position of the first well component.

5. The method of claim 1, further comprising:
   detecting a selection of the first well component object; and
   displaying, in the user interface and while the first well component object is selected, well parameters associated with the first well component in response to detecting the selection of the first well component object.

6. The method of claim 5, further comprising, in response to detecting the selection of the first well component object:
   transmitting a request for the well parameters associated with the first well component to a computer-readable storage medium storing well data including the well parameters associated with the first well component; and
   receiving, from the computer-readable storage medium, the well parameters associated with the first well component in response to transmitting the request.

7. The method of claim 6, further comprising:
   receiving a request for documentation associated with the first well component; and
   in response to receiving the request for the documentation:
      transmitting a request for the documentation to the computer-readable storage medium;
      receiving the documentation from the computer-readable storage medium in response to transmitting the request; and
      displaying at least a portion of the documentation in the user interface.

8. The method of claim 5, further comprising:
   detecting an input to select the first well component object;
   displaying, in the user interface, the well parameters in an editable user interface portion;
   receiving, through the editable user interface portion, edits to one or more of the well parameters;
   updating the well parameters based on the edits received through the editable user interface portion; and
   updating, in the user interface, the first well component object according to updates to the well parameters.

9. The method of claim 5, further comprising:
   displaying a third well component object at a third user interface position in the user interface, the third user interface position corresponding to a third well position of a third well component represented by the third well component object in the wellbore;
   detecting a selection of the third well component object; and
   in response to detecting the selection of the third well component object:
      displaying, in the user interface and while the third well component object is selected, well parameters associated with the third well component, and
      removing, from the user interface, the well parameters associated with the first well component.

10. The method of claim 1, wherein the user interface is a first user interface portion, and wherein the method further comprises displaying, in a second user interface portion, a plurality of user interface objects, each user interface object representing a collection of wellbore features, each collection including at least one wellbore feature.

11. The method of claim 10, further comprising not displaying the first user interface portion in response to displaying the second user interface portion.

12. The method of claim 10, further comprising:
   detecting, in the second user interface portion, a selection of a user interface object representing a first collection of wellbore features including the first well component; and
   in response to detecting the selection of the user interface object representing the first collection of wellbore components, displaying, in the second user interface portion, well parameters associated with wellbore components in the first collection, the well parameters including well parameters associated with the first well component.

13. The method of claim 12, further comprising:
   receiving, in the second user interface portion, input to modify the well parameters associated with the first well component;
   in response to receiving the input:
      displaying, in the second user interface portion, modified well parameters associated with the first well component, the modified well parameters modified according to the input to modify;
      updating the well design displayed in the first user interface portion according to the modified well parameters; and
      displaying, in the first user interface portion, an updated well design including an updated wellbore profile representing the wellbore.

14. The method of claim of claim 11, wherein the plurality of user interface objects includes at least one of a first user interface object representing a collection of casing components, a second user interface object representing a collection of tubing components, a third user interface object representing a collection of packer components, or a fourth user interface object representing a collection of liner components.

15. A non-transitory computer-readable medium storing instructions executable by one or more processors to perform operations comprising:
   displaying, by one or more processors and in a user interface, a well design including a wellbore profile representing a wellbore, wherein the well design displayed in the user interface represents a vertical wellbore profile of the wellbore on a vertical plane and a horizontal wellbore profile of the wellbore including a plan view of a wellbore trajectory of the wellbore;
   displaying, by the one or more processors, a first well component object positioned at a first user interface position in the user interface, the first user interface position corresponding to a first well position of a first well component represented by the first well component object in the wellbore;
   detecting, by the one or more processors, a positioning of a second well component object at a second user interface position in the user interface, the second user interface position corresponding to a second well position of a second well component represented by the second well component object in the wellbore;

determining, using the well design, a compatibility of the second well component positioned at the second well position with the first well position of the first well component;

detecting, in the user interface, a movement of a position indicator along a plurality of vertical wellbore profile positions included in the vertical wellbore profile; and at each position of the plurality of vertical wellbore profile positions:

identifying a corresponding horizontal wellbore profile position in the horizontal wellbore profile; and displaying, on the wellbore trajectory, a user interface object at the corresponding horizontal wellbore profile position.

16. The medium of claim 15, wherein determining, using the well design, the compatibility comprises determining that positioning the second well component at the second well position is compatible with the first well position of the first well component, and wherein the operations further comprise displaying the second well component object at the second user interface position in response to determining that positioning the second well component at the second well position is compatible with the first well position of the first well component.

17. The medium of claim 15, wherein determining, using the well design, the compatibility comprises determining that positioning the second well component at the second well position is incompatible with the first well position of the first well component, and wherein the operations further comprise displaying the second well component object at the second user interface position in response to determining that positioning the second well component at the second well position is incompatible with the first well position of the first well component.

18. A system comprising:

a display device;

one or more processors connected to the display device; and a computer-readable medium storing instructions executable by the one or more processors to perform operations comprising:

displaying, by one or more processors and in the display device in a user interface, a well design including a wellbore profile representing a wellbore, wherein the well design displayed in the user interface represents a vertical wellbore profile of the wellbore on a vertical plane and a horizontal wellbore profile of the wellbore including a plan view of a wellbore trajectory of the wellbore;

displaying, by the one or more processors, a first well component object positioned at a first user interface position in the user interface, the first user interface position corresponding to a first well position of a first well component represented by the first well component object in the wellbore;

detecting, by the one or more processors, a positioning of a second well component object at a second user interface position in the user interface, the second user interface position corresponding to a second well position of a second well component represented by the second well component object in the wellbore;

determining, using the well design, a compatibility of the second well component positioned at the second well position with the first well position of the first well component;

detecting, in the user interface, a movement of a position indicator along a plurality of vertical wellbore profile positions included in the vertical wellbore profile; and at each position of the plurality of vertical wellbore profile positions:

identifying a corresponding horizontal wellbore profile position in the horizontal wellbore profile; and displaying, on the wellbore trajectory, a user interface object at the corresponding horizontal wellbore profile position.

* * * * *